(No Model.)
S. H. CHILCOTE.
COMBINED CAN OPENER AND CORKSCREW.
No. 283,967. Patented Aug. 28, 1883.
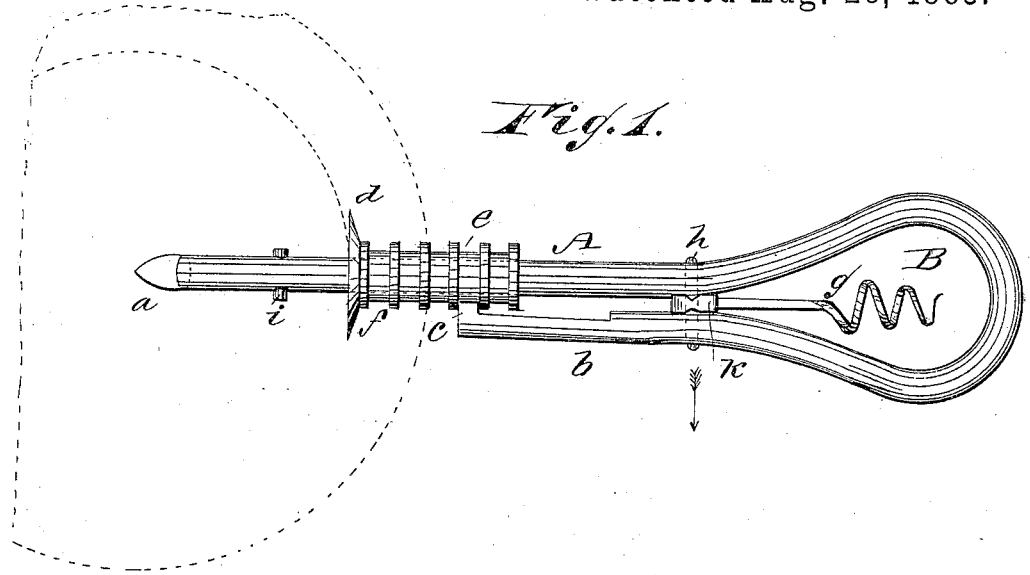
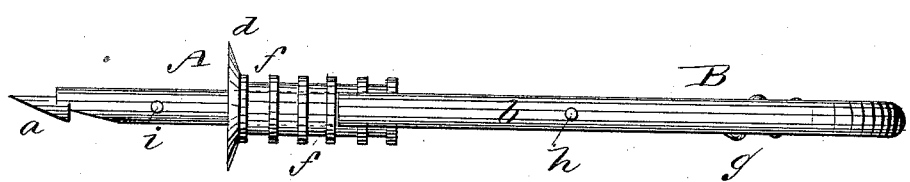
WITNESSES:
Theo. G. Hoster
C. Sedgwick
INVENTOR:
S. H. Chilcote
BY Munn & Co.
ATTORNEYS.

UNITED STATES PATENT OFFICE.

STEPHEN H. CHILCOTE, OF SEGO, OHIO, ASSIGNOR OF ONE-HALF TO ROBINSON F. CHILCOTE, JOHN W. CHILCOTE, AND SAMUEL F. CHILCOTE, ALL OF SAME PLACE.

COMBINED CAN-OPENER AND CORKSCREW.

SPECIFICATION forming part of Letters Patent No. 283,967, dated August 28, 1883.

Application filed May 1, 1883. (No model.)

*To all whom it may concern:*

Be it known that I, STEPHEN H. CHILCOTE, of Sego, in the county of Perry and State of Ohio, have invented a new and Improved Combined Can-Opener and Corkscrew, of which the following is a full, clear, and exact description.

My invention consists in a rotary can-opener having its knife adjustable to suit the size of can and with its handle portion formed to receive a corkscrew, the arrangement being such that the handle is an essential portion of both the can-opener and the corkscrew, as hereinafter described and claimed.

Reference is to be had to the accompanying drawings, forming a part of this specification, in which similar letters of reference indicate corresponding parts in both the figures.

Figure 1 is a plan view, and Fig. 2 a side view, of my improved tool.

A is the shank portion of the tool, consisting of a metal rod having one end filed down to form a point, $a$, and the other end bent in form of a loop to form a spring-handle, B. The end $b$, forming one side of the handle, extends along parallel with the shank for a short distance, and terminates with a lug or hook, $c$, that is pressed against the side of the shank by the spring of the metal.

$d$ is the rotary cutter, attached on the end of a tube, $e$, which is loose on shank A, so as to revolve freely, and so that the cutter can be moved to and from the point $a$, according to the size of the can. The tube $e$ is formed with grooves $f$, that are engaged by the hook end $c$ of the spring-handle end $b$, whereby the tube and cutter are held in position as adjusted. The cutter $d$ is flat on its inner side and beveled on the outer side, so that it will cut in a circle more readily.

$g$ is a corkscrew, of ordinary character, held between the sides of the spring-handle B on a cross-pin, $h$, and formed with a cam-hub, $k$, by which the handle is forced apart when the screw is turned out, and by which the screw is held in either position—that is, within the handle or turned out for use. When it is desired to adjust the cutter, the tube $e$ can be released by turning out the screw partly to spread the handle $a$.

At $i$ is a pin in shank A, for holding the cutter when moved to its extreme inward position.

It will be seen that the spring-handle B is an essential portion of both the can-opener and of the corkscrew. The advantages of this tool may be stated as follows:

By having a cutter revolving on the handle, there is no tendency for the handle to turn in the hand, so that a firm grip is not necessary, as is the case with rotary can-openers as heretofore made. The whole tool can be inexpensively constructed, and the point being filed out of the solid rod, no forging is required. Further, the two articles properly belong together, and are so combined that each co-operates in the use of the other, thus forming a complete instrument.

I am aware that can-openers have been formed with a point, a rotary cutter, and a cutter-sleeve loose on the tool-shank; but

What I claim as new and of my invention is—

1. The combination-tool consisting of shank A, formed with spring-handle B and point $a$, the cutter $d$, tube $e$, and corkscrew $g$, arranged substantially as described.

2. The cutter $d$ and grooved tube $e$, combined with shank A, having point $a$, and handle B, having its end $b$ formed to engage the tube, substantially as described.

3. The combination, with a cutter-sleeve having annular grooves $f$, of the spring-handle loop B, having the end lug, $c$, whereby the cutter may be graduated in position and there held, according to the diameter of the cam, as described.

4. The combination, with the can-opener A, having spring-bow B, end lug, $c$, and annularly-grooved loose sleeve $e$, of the cam $k$, pivoted on cross-pin $h$, and adapted, when turned, to lift the end $b$ and raise the lug $c$ out of sleeve-groove, as shown and described.

STEPHEN H. CHILCOTE.

Witnesses:
EZRA MADDEN,
A. E. HENDERSON.